United States Patent [19]

Golden

[11] Patent Number: 5,201,560
[45] Date of Patent: Apr. 13, 1993

[54] VACUUM CUP CONTROL APPARATUS

[75] Inventor: Michael J. Golden, Sterling Heights, Mich.

[73] Assignee: John A. Blatt, Grosse Pointe Farms, Mich.

[21] Appl. No.: 756,497

[22] Filed: Sep. 9, 1991

Related U.S. Application Data

[63] Continuation-in-part of Ser. No. 645,135, Jan. 24, 1991.

[51] Int. Cl.$^5$ .......................... B25J 15/06; F04F 5/48
[52] U.S. Cl. .............................. 294/64.2; 137/487.5; 417/187
[58] Field of Search ......................... 294/64.1, 64.2, 65, 294/907; 137/487.5, 502, 557, 560; 271/96, 98, 108; 307/118; 414/627, 737, 752; 417/182, 185-193

[56] References Cited

U.S. PATENT DOCUMENTS

| | | | |
|---|---|---|---|
| 2,934,086 | 4/1960 | Blatt | 137/560 |
| 3,349,927 | 10/1967 | Blatt | 294/64.2 X |
| 3,568,959 | 3/1971 | Blatt | 294/64.2 |
| 3,613,904 | 10/1971 | Blatt | 294/64.2 X |
| 4,089,622 | 5/1978 | Aubel et al. | 417/189 X |
| 4,417,312 | 11/1983 | Cronin et al. | 137/487.5 X |
| 4,453,755 | 6/1984 | Blatt et al. | 294/64.2 |
| 4,655,692 | 4/1987 | Ise | 294/64.2 X |
| 4,679,583 | 7/1987 | Lucas et al. | 137/487.5 X |
| 4,750,768 | 6/1988 | Kumar | 294/64.1 |
| 4,777,383 | 10/1988 | Waller et al. | 307/118 |
| 4,828,306 | 5/1989 | Blatt | 294/64.2 |
| 4,865,521 | 9/1989 | Ise et al. | 417/187 |
| 4,950,016 | 8/1990 | Kumar | 294/64.2 |
| 4,957,318 | 9/1990 | Blatt | 294/64.1 |

Primary Examiner—Johnny D. Cherry
Attorney, Agent, or Firm—Basile and Hanlon

[57] ABSTRACT

A vacuum cup control apparatus for applying and releasing vacuum in a vacuum cup includes a venturi passage for inducing a vacuum within the vacuum cup upon the flow of pressurized air therethrough. Another air flow passage extends through the housing for injecting a flow of air under pressure to the vacuum cup to relieve the vacuum therein. A sensor senses the vacuum level attained in the vacuum cup. A feedback signal is sent by the control apparatus to the external controller as an indication that a predetermined, selectable vacuum level has been achieved. The control apparatus is responsive to the sensor and signals from an external controller for applying vacuum to the vacuum cup until a predetermined vacuum level is attained in the vacuum cup. After the initial application of vacuum and prior to the injection of air under pressure to the vacuum cup, if the vacuum level within the vacuum cup decreases below the predetermined set level, the control apparatus will automatically reapply vacuum until the predetermined vacuum level is reached. A plurality of comparators, each provided with offset reference signal inputs, are responsive to the output of the sensor and generate a plurality of discrete vacuum select levels. A selector switch selects one of the comparator outputs to specify a predetermined vacuum level in the vacuum cup.

9 Claims, 7 Drawing Sheets

VACUUM CUP CONTROL APPARATUS

CROSS REFERENCE TO CO-PENDING APPLICATION

The present application is a continuation-in-part of co-pending application Ser. No. 07/645,135, filed on Jan. 24, 1991, the name of Michael J. Golden and entitled "VACUUM CUP CONTROL APPARATUS".

BACKGROUND OF THE INVENTION

1. Field of the Invention

The present invention relates, in general, to vacuum cups and, more specifically, to control apparatus for applying and releasing a vacuum from a vacuum cup.

2. State of the Art

Vacuum cups are commonly employed as workpiece gripping elements to engage and transport a workpiece in a manufacturing operation, to load and unload sheet metal parts into and from a die, or to carry a part, such as an automobile windshield, to the vehicle to which it is to be installed.

Such vacuum cups employ a control apparatus which uses a venturi passage in a body which is connected to a source of air under pressure. Air flow through the venturi passage induces a subatmospheric pressure in the throat of the venturi and in a passage connecting the venturi throat to the interior of the vacuum cup which will induce a vacuum within the cup when the cup engages a workpiece surface. In earlier versions of such vacuum cup control apparatus, it was necessary to constantly maintain the flow of air through the venturi passage in order to maintain the vacuum in the cup because the air withdrawn from the cup flowed into the venturi passage and to the discharge vent at the end of this passage. Upon cessation of the air flow, air at atmospheric pressure was free to flow in a reverse direction through the discharge vent, the venturi passage and into the vacuum cup to dissipate the vacuum therein.

Efforts to address this problem led to the use of one-way check valves between the venturi and the vacuum cup to seal the vacuum in the vacuum cup upon cessation of air flow through the venturi. This enabled the vacuum cup to securely maintain a grip on a workpiece after air flow through the venturi was stopped.

Another problem with previously devised vacuum cups deals with the quick release of the vacuum from the cup to release the workpiece at the conclusion of the handling operation. The passage from the discharge vent to the vacuum cup is a relatively restricted passage and the rate of air flow through this passage would diminish substantially as the pressure differential between the negative pressure within the cup and atmospheric pressure approached equalization. Further, even when the vacuum was turned "off", the suction remaining between the vacuum cup and the workpiece could be sufficient to cause the vacuum cup to remain attached to the workpiece and thereby prevent or make uncertain the release of the workpiece from the vacuum cup.

Efforts to overcome this problem led to the use of "blow-off" passages which inject air under pressure into the vacuum cup to rapidly release the vacuum between the vacuum cup and the workpiece. Despite these advances in the use of vacuum cups as work gripping elements, problems are still encountered. Leaks can occur in the vacuum cup or between the vacuum cup and the workpiece which cause a decrease in the vacuum in the vacuum cup and could lead to inadvertent separation of the workpiece from the vacuum cup. Such leaks could result from worn or cracked vacuum cups, deformed workpieces, etc. No apparatus has been devised for vacuum cups which detects leaks or a decrease in vacuum levels within a vacuum cup so as to enable vacuum to be reapplied to the vacuum cup to a preset level.

U.S. Pat. No. 4,750,768 discloses a gripper device using a plurality of vacuum cups in which a sensor associated with each vacuum cup senses contact between the associated vacuum cup and an object. An output signal from the sensor then causes vacuum to be applied to the vacuum cup. Only those vacuum cups where contact with a workpiece or object is detected by the associated sensor have vacuum applied thereto. However, this control apparatus still does not detect a decrease in vacuum level within the vacuum cup after vacuum has been initially applied to the vacuum cup or reapply vacuum to the vacuum cup after the initial application of vacuum to maintain the vacuum at a preset level.

Thus, it would be desirable to provide a control apparatus for vacuum cups which overcomes the problems associated with previously devised vacuum control apparatus. It would also be desirable to provide a control apparatus for vacuum cups which detects the vacuum level in the vacuum cup so as to cease the application of vacuum when the vacuum level reaches a preset level and which reapplies vacuum to the vacuum cup when a decrease in vacuum below a predetermined amount is detected.

SUMMARY OF THE INVENTION

The present invention is a vacuum cup control apparatus for applying and releasing vacuum to a vacuum cup engaging a workpiece and for automatically reapplying vacuum to the vacuum cup in the event of a decrease in vacuum in the vacuum cup while the vacuum cup is engaged with a workpiece.

In a first embodiment, the vacuum cup control apparatus includes a housing having a first flow passage extending therethrough between a first inlet end connectable to a source of pressurized air and an outlet vented to atmosphere. A venturi means including a throat section is formed in the housing and disposed in fluid flow communication with the first passage for providing a subatmospheric pressure in the throat section upon the flow of air through the first passage. A second flow passage is formed in the housing and extends from the first flow passage to a control outlet port on the housing. A one-way valve means is disposed in the second passage means for allowing flow in one direction from the control port through the second passage to the first passage. A third passage means is also formed in the housing and is connected to the source of pressurized air and to the control port for supplying air under pressure to the vacuum cup to release the vacuum in the vacuum cup.

Sensor means are mounted in the housing for sensing the vacuum at the control port. Input/output connector means are also mounted in the housing for receiving an electrical signal from an external controller to separately apply and release vacuum to the vacuum cup.

A control means is responsive to the sensor means and the connector means for controlling the application of vacuum to the vacuum cup, the application of pressurized air to the vacuum cup and the reapplication of vacuum to the vacuum cup in the event of a decrease in vacuum below a predetermined level after vacuum has been initially applied to the vacuum cup and prior to the application of pressurized air to the vacuum cup. In a preferred embodiment, the control means includes valve means for controlling the flow of air to the first and third passages in the housing. The valve means preferably comprises first and second separably operable valves, each respectively connected to the first and third passages and to a source of pressurized air.

The control means also includes a first comparator means responsive to the output of the sensor means and a reference signal for specifying a predetermined maximum vacuum in the vacuum cup. The first comparator means generates an output signal when the vacuum sensed by the sensor means reaches the predetermined vacuum level established by the reference signal. A first driver means is connected to the first comparator means for energizing the valve means to apply vacuum to the vacuum cup. First logic means is responsive to the first comparator means and the connector means for activating the driver means to apply vacuum to the vacuum cup and to deactivate the driver means when a predetermined vacuum level is reached in the vacuum cup.

The control means further includes a second comparator means, responsive to a second reference signal and the output of the sensor means, for generating an output signal when the sensor output exceeds the level specified by the second reference signal. A second driver means is responsive to the output signal from the second comparator means for energizing the valve means to apply air under pressure to the vacuum cup. A second logic means is responsive to the second comparator means and the connector means for activating the second driver means to apply air under pressure to the vacuum cup to release vacuum therefrom.

Finally, the control means also includes a third comparator means, responsive to a third reference signal and the output of the sensor means, for generating an electrical signal indicative of a predetermined vacuum level in the vacuum cup. A third driver means is connected to the third comparator means and to the input/output connector means for supplying the output signal from the third comparator means to an external controller.

In a second embodiment, a centralized vacuum control apparatus is disclosed in which a centrally located control means, valves and venturi are connected by an air flow line to a remote manifold to which one or more vacuum responsive devices, such as vacuum cups, are connected in fluid flow communication. The sensor means in this embodiment is disposed in fluid flow communication with the air line. The first valve means controls the flow of pressurized air to the venturi to create a vacuum in the air flow line. The control means is responsive to the sensor means and a connector means receiving external electrical signals specifying the application and release of vacuum in the air line for controlling the selective application of a predetermined vacuum pressure to the vacuum responsive device and the reapplication of vacuum to the vacuum responsive device in the event of a decrease of vacuum below a predetermined level after vacuum has been initially applied to the vacuum responsive device.

The control means includes comparator means, responsive to the sensor output and a plurality of reference signals. The comparator means compares the sensor means output with each reference signal and generates one of a plurality of discrete outputs, each corresponding to a different vacuum level output, with one of the outputs being energized when the actual vacuum level sensed by the sensor means equals a particular reference signal. Means are provided for selecting one of the comparator outputs as an output specifying a predetermined amount of vacuum in the vacuum responsive device. First drive means are responsive to the output of the selecting means for energizing the first valve means to supply pressurized air to the venturi to create a specified vacuum level in the vacuum responsive device when the output of the sensor means indicates a vacuum level less than the selected vacuum level.

The comparator means preferably comprises a plurality of individual comparators, with the output of the sensor means being connected as an input to each of the plurality of individual comparators. Means are provided for varying the magnitude of the reference signal applied to each of the plurality of comparators by a predetermined amount from the magnitude of the reference signal applied to a preceding one of the comparators.

In a preferred embodiment, the reference signals applied to each of the comparators are offset from the reference signal input to a preceding comparator via a resistor which is connected in a series arrangement of resistors to a common reference signal source. This offsets the reference signal input to each of the plurality of comparators by a predetermined, discrete, incremental amount such that each comparator has a reference signal input whose magnitude is offset from the preceding and succeeding comparators by a predetermined incremental amount. This provides a plurality of discrete, incremental, equally spaced output levels from the comparators which are compared with the output of the sensor means to enable one of a plurality of discrete vacuum levels to be selected for the vacuum responsive device.

The selecting means preferably comprises a switch means having a switchable member movable between a plurality of discrete positions. Each position is connected to one of the plurality of comparator outputs for selecting one of the comparator outputs to specify a desired vacuum level in the vacuum responsive device. The switch means may also select one of a plurality of the comparator outputs for use as a feedback signal indicating that a predetermined vacuum level, which may be different from the desired, higher vacuum level, has been attained in the air flow line or in the vacuum responsive device.

The vacuum control apparatus of the present invention overcomes many of the deficiencies found in previously devised vacuum control apparatus. The vacuum control apparatus of the present invention uniquely senses the vacuum level in a vacuum responsive device, such as a vacuum cup, and automatically reapplies vacuum to the vacuum cup if any decrease in the vacuum level occurs. This insures that a proper vacuum level is maintained in the vacuum cup to maintain secure engagement with a workpiece.

The vacuum cup control apparatus of the present invention also provides for selective blow-off or the application of pressurized air to the vacuum cup to relieve the vacuum in the vacuum cup and to positively separate a workpiece from engagement with the vacuum cup. After an initial blow-off, if vacuum is generated between the vacuum cup and the workpiece for any reason, the control apparatus automatically reapplies pressurized air to the vacuum cup to insure a complete disengagement of the workpiece from the vacuum cup.

The vacuum cup control apparatus of the present invention is constructed in a small and economical manner so as to be easily attached to an individual vacuum cup. Alternately, the control apparatus can be constructed as a centralized unit with a vacuum/air flow line extending from a centralized unit or housing to a manifold to which a plurality of individual vacuum cups are connected.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
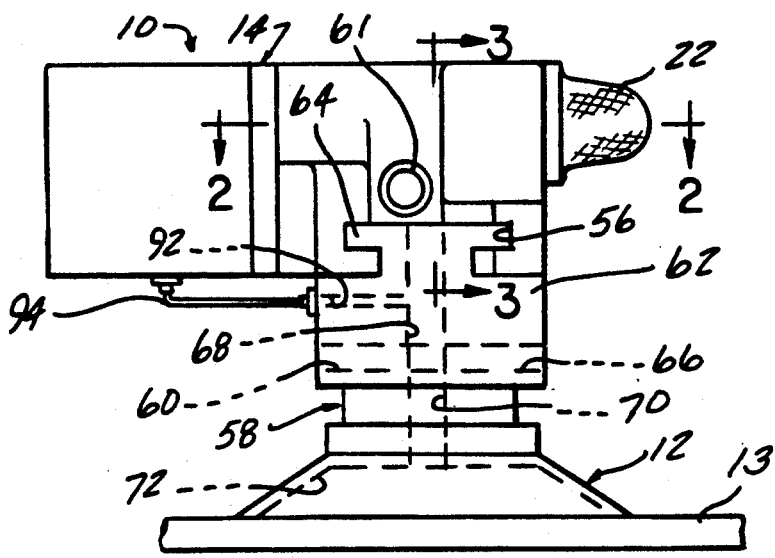
FIG. 1 is a side elevational view of a vacuum control apparatus constructed in accordance with the teachings of the present invention.
Figure 2:
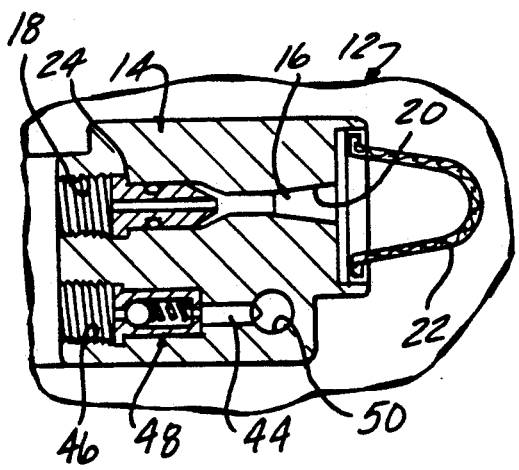
FIG. 2 is a cross sectional view generally taken along line 2—2 in FIG. 1.
Figure 3:
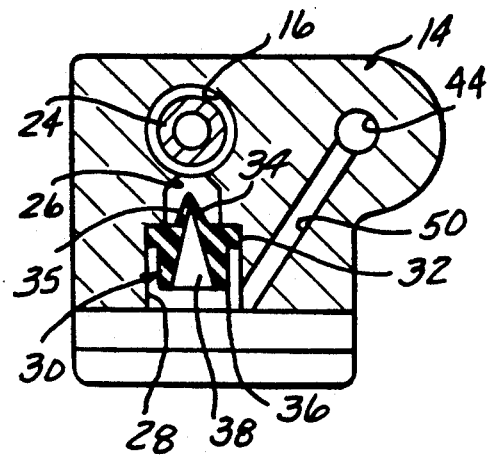
FIG. 3 is a cross sectional view generally taken along line 3—3 in FIG. 1.

Referring now to the drawing, and to FIGS. 1, 2 and 3 in particular, there is illustrated a vacuum cup control apparatus 10 which applies and releases vacuum from a vacuum cup 12 engaging a workpiece 13.

A vacuum cup 12 having any conventional form is connected to a housing shown generally by reference number 14. The housing 14 may be a single piece member or separate elements connected together by suitable fasteners.

A first flow passage means, such as a venturi passage 16, is formed in the housing 14. The venturi passage 16 extends from an inlet 18 at one end of the housing 14 to a discharge opening 20 at the opposite end of the housing 14. A conventional silencer 22 may be mounted at the discharge end 20 of the venturi passage 16.

The venturi passage 16 is of a conventional, well-known configuration and includes a nozzle 24 mounted therein. As is well known, a flow of air through the venturi passage 16 from the inlet 18 to the outlet 20 will induce a subatmospheric pressure in the region of the throat or small diameter section of the venturi passage 16. This region of reduced pressure is employed to induce a vacuum within the interior of the vacuum cup 12 through a second passage means or flow path 26. The second passage 26 extends from the region of reduced pressure in the venturi passage 16 to a control port 28 which is disposed in fluid flow communication with the vacuum cup 12, as described hereafter.

A one-way check valve 30 is mounted within the second passage 26 and is oriented to permit a flow of air from the control port 28 to the venturi passage 16 when the pressure at the control port 28 exceeds the pressure in the venturi passage 16. When air is flowing through the venturi passage 16, a subatmospheric pressure will be induced in the upper end of the second passage 26 and air will flow from the interior of the vacuum cup 12 into the control port 28, through the valve 30 and into the venturi passage 16 until the pressure within the interior of the vacuum cup 12 is equalized with that existing in the subatmospheric pressure region of the venturi passage 16.

As is well known and described in greater detail in U.S. Pat. No. 4,828,306, the contents of which are incorporated herein by reference, the check valve 30 is of a one-piece molded construction of rubber or other resilient synthetic material formed into a configuration shown in FIG. 3. The exterior of the check valve 30 is formed with a disc-like mounting or locating flange 32 from which a wedge-shaped outlet section 34 upwardly protrudes. A cylindrical inlet portion 36 projects downwardly from the underside of the flange 32.

A passage 38 extends upwardly through the inlet 36 and the wedge shaped outlet 34. A slit 35 is formed in the upper edge of the wedge shaped outlet portion 34 and defines an outlet at the upper end of the passage 38. The slit 35 is normally closed. When the pressure within the passage 38 of the valve 30 exceeds the pressure acting on the exterior of the wedge shaped outlet 34, the walls of the wedge shaped outlet 34 will flex outwardly to open the slit 35 to permit air to flow upwardly from the passage 38 through the opened slit 35. If, however, the pressure acting on the exterior of the wedge shaped outlet 34 exceeds that within the interior of the wedge shaped outlet 34, then the slit 35 will be closed to prevent flow of air through the slit 35. The valve 30 thus acts as a one-way check valve which will permit air to flow from the control port 28 to the venturi passage 16 to evacuate the vacuum cup 12, but will block the flow of air from the passage 16 to the control port 28 whenever the pressure at the control port 28 is less than that in the venturi passage 16. Once a vacuum is established within the vacuum cup 12 between the interior of the vacuum cup 12 and a workpiece 13, the check valve 30 will lock this vacuum in the vacuum cup 12, even if the flow of air through the venturi passage 16 is stopped and pressure within the venturi passage 16 returns to normal atmospheric pressure.

In order to release the vacuum within the vacuum cup 12, a third passage 44 extends through the housing 14 from a first end 46. A one-way, spring-loaded, ball check valve 48 is located within the third passage 44 and is oriented to seat toward the inlet 46; that is, the valve 48 will accommodate air flow from the inlet 46 into the third passage 44, but will block air flow from the passage 44 to the inlet 46. The third passage 44 communicates with the control port 28 by an inclined passage 50 which is formed in the housing 14 and extends from one end of the third passage 44 to the control port 28.

The housing 14 is formed with a generally T-shaped slot 56. The housing 14 has protruding shoulders which close one end of the T-shaped slot 56 from the passage of a fitting therethrough.

As shown in FIG. 1, a fitting 58 having a generally T-shaped upper flange 60 is mounted on the vacuum cup 12. Normally, and as described in U.S. Pat. No. 4,957,318, the contents of which are incorporated herein by reference, the T-shaped flange 60 of the fitting 58 on the vacuum cup 12 will be slidingly urged into the slot 56 in the housing 14 and be locked therein via a spring-biased ball. A release push button 61 mounted externally on the housing 14 acts on the ball to retract the ball from engagement with the T-shaped flange 60 to enable the T-shaped flange 60 and the entire vacuum cup 12 to be slidingly removed from the housing 14.

In the present invention, an intermediate connector block 62 is provided with a T-shaped upper flange 64. The T-shaped flange 64 on the connector block 62 slidingly engages the slot 56 in the housing 14 and is locked therein via the ball means described above. The connector block 62 includes a lower T-shaped slot 66 which slidingly receives the T-shaped flange 60 on the suction cup 12. Suitable locking and release means as described above may be provided on the connector block 62 to releasably lock the suction cup 12 to the connector block 62.

As shown in FIG. 1, the connector block 62 has a centrally located bore 68 extending therethrough. The bore 68 is disposed in fluid flow communication with the control port 28 on the housing 14 when the connector member 62 is mounted to the housing 14. Similarly, the lower end of the bore 68 is disposed in fluid flow communication with a bore 70 extending through the T-shaped fitting 58 on the suction cup 12 to dispose the hollow interior 72 of the suction cup 12 in fluid flow communication with the control port 28 on the housing 14.

Figure 4:
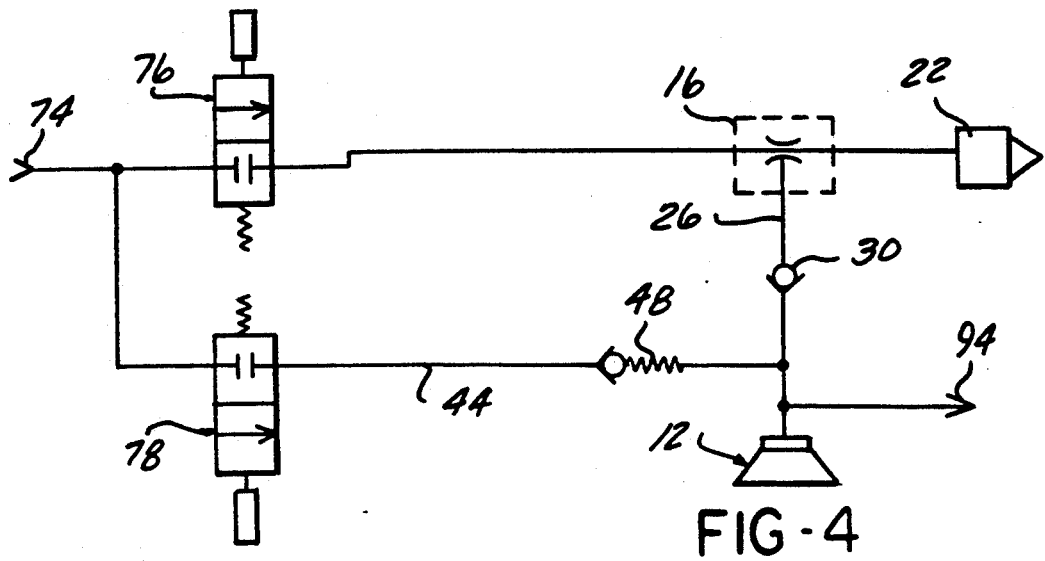
FIG. 4 is a pneumatic diagram of the vacuum control apparatus of the present invention.

Referring now to FIG. 4, the housing 14 is connected to a source 74 of pressurized air. In this manner, pressurized air is supplied to the venturi passage 16 and the third passage 44 in the housing 14. Valve means are provided for selectively applying and releasing vacuum from the vacuum cup 12. In a preferred embodiment, the valve means comprises first and second valves 76 and 78 which are respectively connected to the venturi passage 16 and the third passage 44.

Preferably, the first and second valve means 76 and 78 comprise individual solenoid operated, spring-return, poppet valves. Alternately, a single valve may be employed to direct pressurized air through each of the venturi passage 16 and the third passage 44. Such a single valve may be a four-way, double solenoid-operated, blocked center valve. In either case, the valve means is mounted within the housing 14 with suitable connections to an external source 74 of pressurized air.

Figure 5:
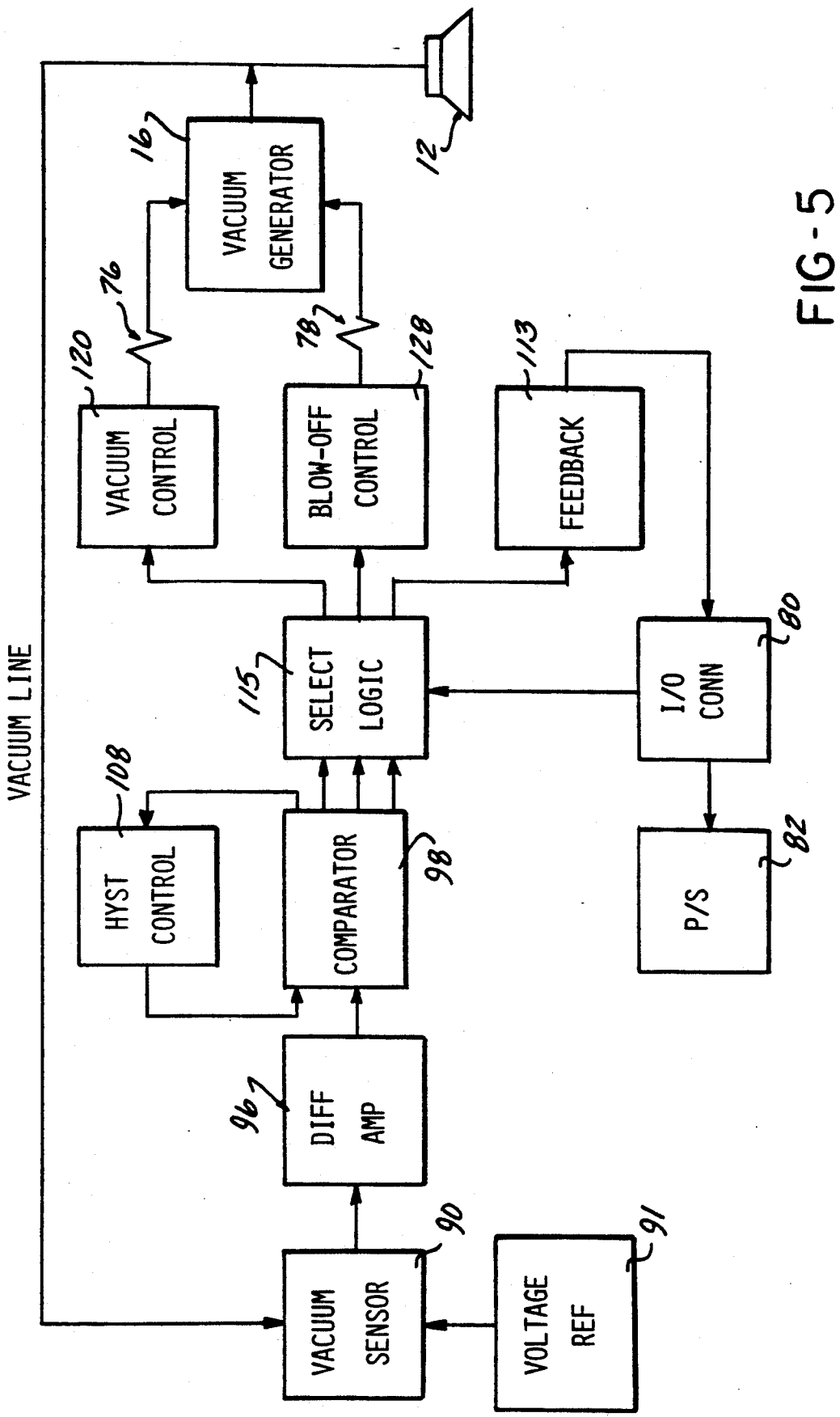
FIG. 5 is an electrical block diagram of one embodiment of the vacuum control apparatus of the present invention.
Figure 6:
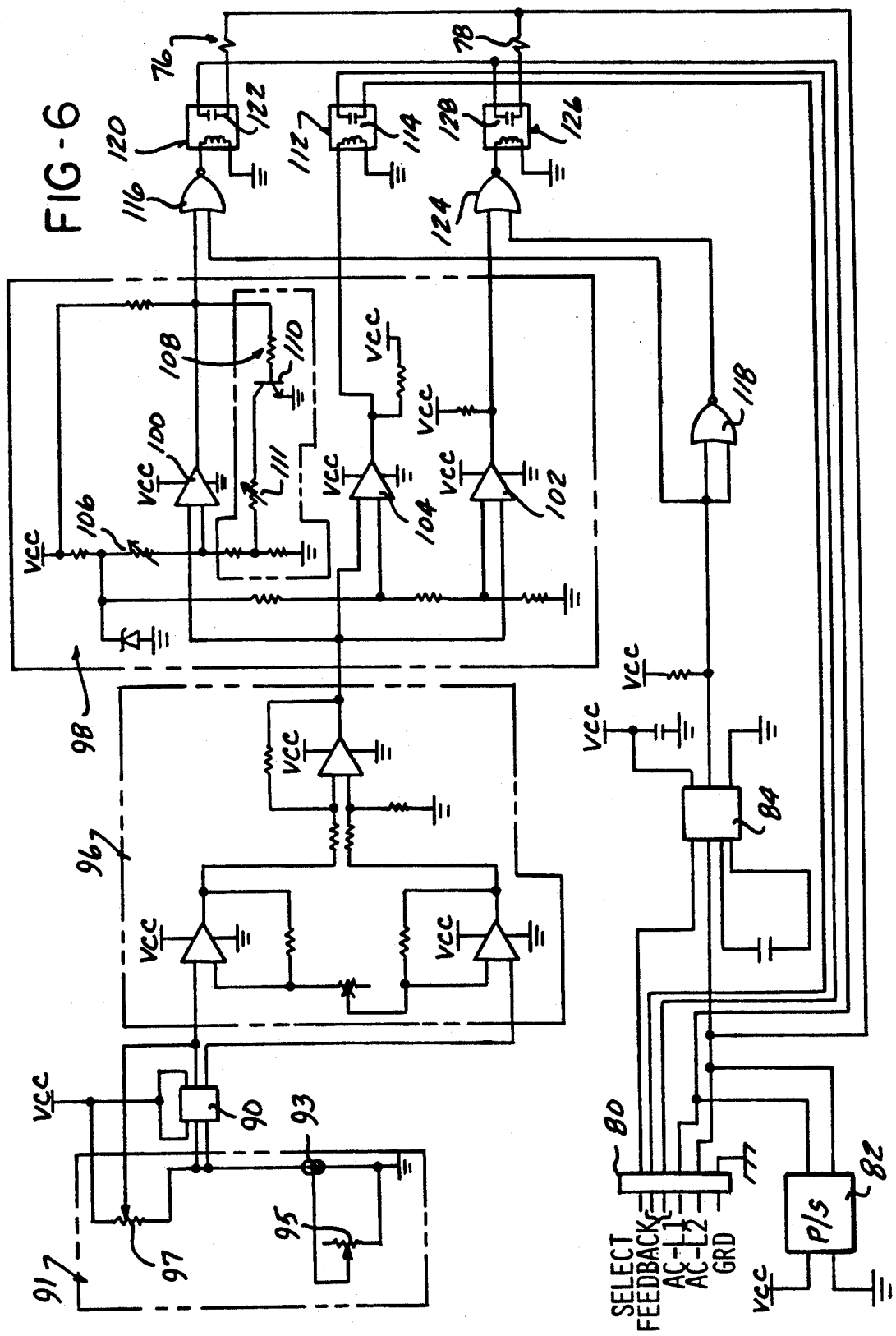
FIG. 6 is a detailed circuit diagram of the vacuum cup control apparatus shown generally in FIG. 5.

The control means of the apparatus 10 of the present invention is shown in detail in FIGS. 5 and 6. The control means includes an input/output connector means 80 which is mounted in the housing 14 and connects control signals between the circuitry employed in the control means in the housing 14 and an external control device or controller, such as a programmable logic controller (PLC). The external controller supplies various input signals labelled "SELECT", "AC-L1", "AC-L2" and ground to the control means. A signal labelled "FEEDBACK" is generated by the control means and supplied to the external controller.

The control means further includes an internal power supply 82 which is connected to the AC-L1 and AC-L2 lines on the input/output connector means 80. The power supply 82 generates the required low level DC voltages required by the electronic components used in the control means. This low level voltage is labelled "VCC" and is connected to the various components of the control means.

The control apparatus mounted in the housing 14 includes a pressure sensor means 90 which detects the pressure or vacuum level at the control port 28 in the housing 14. The sensor means 90 may comprise any conventional type of sensor which provides an electrical output signal indicative of the pressure levels sensed thereby. For example, a pressure sensor 90, Model No. NPS-200-D1 manufactured by Nova Sensor, may be employed in the present invention.

Referring briefly to FIG. 1, an auxiliary flow passage 92 is formed in the connector block 62 and is disposed in fluid flow communication at one end with the central bore 68 in the connector block 62 and the control port 28 in the housing 14 when the connector block 62 is mounted on the housing 14. A separate conduit 94 extends from one end of the passage 92 to the housing 14. The other end of the conduit 94 is connected to the pressure sensor 90 in the housing 14 to enable the vacuum level within the vacuum cup 12 or at the control port 28 disposed in fluid flow communication with the vacuum cup 12 to be measured.

As shown in FIGS. 5 and 6, the pressure sensor 90 is provided with a voltage reference circuit 91 which includes an excitation source 93, such as a constant current source, which is adjusted by a first potentiometer 95. An offset voltage is supplied by a second potentiometer 97.

The output from the pressure sensor 90 is input to a differential amplifier means 96. The differential amplifier means 96 is formed of three operational amplifiers which amplify the low level signal from the pressure sensor 90 to a more useful level. The output from the differential amplifier means 96 is input to a comparator means 98. In a preferred embodiment, the comparator means 98 comprises a three stage comparator formed of a first comparator 100, a second comparator 102 and a third comparator 104. The first comparator 100 functions to turn the vacuum generator off when the vacuum level within the suction cup 12 reaches a predetermined level set by a reference voltage determined, in part, by potentiometer 106. The voltage reference signal from the potentiometer 106 is input to the first comparator 100 along with the output of the differential amplifier means 96.

A hysteresis control means or circuit 108 is also connected between the output of the first comparator means 100 and the reference voltage input to the first comparator 100. The hysteresis control means 108 includes a transistor 110 which has one leg connected to the output of the first comparator 100. The collector of the transistor 110 is connected through an adjustable potentiometer 111 to the midpoint of a voltage divider which is connected to the reference voltage input of the first comparator 100.

When the first comparator 100 changes from a low to a high state, the transistor 110 will be driven to a conducting state thereby shunting the lower portion of the first voltage divider with the adjustable potentiometer 111 and causing the voltage reference signal at one input of the first comparator 100 to be lowered a predetermined amount set by the values of the voltage divider resistors and the adjustable potentiometer 111. This provides a window or band, the purpose of which will be described hereafter. The transistor 110 will be rendered non-conductive when the output of the first comparator 100 switches to its normal, low state, as will occur when the output signal from the differential amplifier means 96 decreases below that of the initial voltage reference input signal to the first comparator 100.

The second comparator 102 functions to control the supply of pressurized air or "blow-off" to the vacuum cup 12. Input to the second comparator 102 is a second voltage reference signal and the output from the differential amplifier means 96. The second voltage reference signal is lower than the voltage reference signal supplied to the first comparator 100, such as a signal which would correspond to a small amount of vacuum, such as one inch of mercury, in the vacuum cup 12. The output of the second comparator 102 will be a logic low state if the second reference voltage signal is lower than the output of the differential amplifier means 96. If the second voltage reference signal is higher than the output of the differential amplifier 96, the output of the second comparator 102 will be a logic high state.

The third comparator 104 acts as a feedback signal generator. Input to the third comparator 104 are the output from the differential amplifier means 96 and a third reference voltage input signal. The third reference voltage input signal is selected so that the third comparator 104 will generate an output when a predetermined amount of vacuum, such as twelve inches of mercury, is present in the vacuum cup 12, i.e., when the output of the differential amplifier means 96 is greater than the third voltage reference, the output of the third comparator 104 will be in a logic high state.

The output from the third comparator 104 is supplied to a third driver means 112. The third driver means 112 preferably comprises a relay having one set of contacts 114. The contacts 114 are connected to the input/output connector 80 to provide a switch closure to the external controller indicating that a predetermined amount of vacuum has been achieved in the vacuum cup 12. This signal is used by the external controller in its normal control operation. The third comparator 104 and the third driver 112 thus form a feedback signal generator circuit which is denoted by reference number 113 in FIG. 5.

The first and second comparators 100 and 102, respectively, are connected to a select logic circuit 115. The select logic circuit 115 is formed of an opto-coupler 84 and NOR logic gates 116, 118 and 124. The opto-coupler 84 converts the external controller SELECT signal to a suitable logic level for use by the NOR gates 116 and 118. The outputs of the opto-coupler 84 and the NOR gate 118 are used to enable and disable NOR gates 116 and 124, that is, a logic high level on the input of NOR gates 116 or 124 will force the outputs of the NOR gates 116 and 124 to a low logic level disabling the device driven thereby, as described hereafter. The select logic circuit 115 will select only one of two control modes, i.e., vacuum or blow-off. The output of the first comparator 100 is connected to a first NOR gate 116. The other input to the NOR gate 116 is a signal from the opto-coupler 84. The input to the NOR gate 118 is a signal from the opto-coupler 84. This signal selects either vacuum or blow-off as described hereafter.

When vacuum is selected by the external controller, an output signal labelled "SELECT" will be applied to the opto-coupler 84 through the input/output connector means 80. This signal is converted to a logic low level at the output of the opto-coupler 84 to enable NOR gate 116. The output of the opto-coupler 84 is also inverted by NOR gate 118 which applies a high logic level signal to the input of NOR gate 124 to disable NOR gate 124 thus selecting the vacuum mode and disabling the blow-off mode.

The NOR gate 116, when enabled, energizes a first driver 120, such as a relay having an energizable coil controlling one set of switchable contacts 122. Energization of the relay 120 causes the set of contacts 122 to close thereby supplying AC power to the vacuum control valve 76 which, in turn, supplies pressurized air to the venturi passage 16 and generates a vacuum within the vacuum cup 12 as described above. When the predetermined amount of vacuum is achieved in the vacuum cup 12, the first comparator 100 will generate an output which will cause the output of the NOR gate 116 to go low thereby de-energizing the relay 120 and de-energizing the valve 76 ceasing the flow of air through the venturi passage 16. However, as noted above, the check valve 30 in the second passage 26 will block further air flow to the control outlet 28 thereby locking vacuum in the vacuum cup 12 between the interior of the vacuum cup 12 and the engaged workpiece 13.

Similarly, the output of the second comparator 102 is connected to the NOR gate 124 which has as another input the output of the NOR gate 118. The NOR gate 124 is connected to a second driver 126, such as a relay having an energizable coil controlling one set of switchable contacts 128. The set of contacts 128 is connected to the blow-off control valve 78 which supplies pressurized air to the vacuum cup 12 to positively disengage the workpiece 13 from the vacuum cup 12 and relieve the vacuum within the vacuum cup 12.

If blow-off is selected by the external controller, a SELECT signal of opposite logic level from the vacuum SELECT signal will be applied to the opto-coupler 84 via the input/output connector means 80. The output of the opto-coupler 84 changes states to a high logic level, thus disabling NOR gate 116. The output of the opto-coupler 84 will be inverted by NOR gate 118 to enable NOR gate 124 thus selecting or enabling the blow-off mode.

The relays 112, 120 and 126 may be any suitable relays, such as solid state, electromechanical, etc., as well as other switchable elements, such as transistors. Further, the relays 112, 120 and 126 may be provided at any desired voltage, such as 110 VAC or 24 VDC, as desired for the requirements of a particular application.

In operation, it will be assumed that the vacuum cup control apparatus 10 is in a normal, rest position with no vacuum present in the vacuum cup 12. When it is desired to generate a vacuum in the vacuum cup 12, such as when the vacuum cup 12 is located in close proximity to a workpiece 13, the external controller will generate a vacuum SELECT signal which is supplied to the control apparatus 10 via the input/output connector 80. This signal is input to NOR gate 116 and enables NOR gate 116 causing the relay 120 to be activated and closing its associated contact 122. This energizes the valve 76 which supplies pressurized air through the venturi passage 16. This flow of air through the venturi passage 16 generates a vacuum at the control port 28 and the vacuum cup 12 connected thereto. Vacuum will be continued to be applied to the vacuum cup 12 until a predetermined vacuum level is reached. The vacuum level at the control port 28 is sensed by the vacuum sensor 90 which outputs a signal through the differential amplifier 96 to the first comparator 100. When this signal is slightly greater than the first voltage reference signal supplied as an input to the first comparator 100, the first comparator 100 will generate an output which will cause the NOR gate 116 to switch states and deactivate the relay 120. This opens the contact 122 of the relay 120 and deactivates the valve 76 ceasing the further flow of air through the venturi passage 16 and the further application of vacuum to the vacuum cup 12.

At any time after vacuum is initially applied to the vacuum cup 12 and shut off and prior to the initiation of any blow-off, if, for any event, the vacuum in the vacuum cup 12 decreases below the predetermined level, as sensed by the sensor 90, the sensor 90 will output an appropriate signal which, through the differential amplifier means 96, will be input to the first comparator 100. When this voltage signal decreases below that set as the window or band by the first voltage reference and the hysteresis control 108, the comparator 100 will generate an output which will energize the first relay driver 120 and, thereby, the relay 120 and the vacuum control valve 76 to reapply vacuum to the vacuum cup 12 until the vacuum level within the vacuum cup 12 reaches the predetermined level. When the vacuum in the vacuum cup 12 reaches the predetermined level, the first comparator 100 will change states thereby resetting the hysteresis control 108. This cycle may be repeated indefinitely to overcome any leaks which may be present so as to maintain the vacuum in the vacuum cup 12 between the vacuum cup 12 and the workpiece 13 at a predetermined level.

When it is desired to separate the vacuum cup 12 from the workpiece 13, the external controller will generate a blow-off SELECT signal, i.e., a signal of opposite level from the vacuum SELECT signal, which will cause the output of the NOR gate 118 to switch states. This enables the NOR gate 124 connected to the output of the second comparator 102. NOR gate 124 will generate an output causing the second driver relay 126 to be energized and in turn the closure of its contact 128 whenever a vacuum of a predetermined level is present. This supplies power to the blow-off control valve 78 which supplies pressurized air through the third passage 44 to the vacuum cup 12 relieving the vacuum therein and separating the workpiece 13 from the Vacuum cup 12.

In the event that vacuum is again generated or is still present as the vacuum cup 12 separates from the workpiece 13, the second comparator 102 will sense such vacuum via the vacuum sensor 90 and generate an output signal which will re-energize the relay 126 and reapply power to the blow-off valve 78 to supply another stream of pressurized air to the vacuum cup 12 to insure positive separation between the vacuum cup 12 and the workpiece 13.

The vacuum cup control apparatus 10 described above and illustrated in the drawing controls a single vacuum cup. The apparatus 10 is mounted in a housing to which the vacuum cup is attached. Also within the scope of the present invention is a single centralized control apparatus which controls a plurality of individual, remotely located, vacuum cups. This centralized control apparatus embodiment may be provided in two configurations.

In a first configuration, identical, individual controls for each of a plurality of vacuum cups are located in one centralized location, remote from the vacuum cups. Separate air source 74 lines and vacuum sense lines 94 extend from each control means in the centralized location to each vacuum cup. Each individual control means in the centralized location controls one vacuum cup independent from the other vacuum cups in applying and releasing vacuum to the vacuum cup and sensing the vacuum level within the vacuum cup.

In a second configuration, one centralized control means is connected to a plurality of vacuum cups via individual air source 74 lines and vacuum sense lines 94 extending between the centralized control means and each vacuum cup. In this configuration, the control means simultaneously controls each of the vacuum cups. The vacuum sensors for each vacuum cup are connected in series such that a leak detected in any vacuum cup will cause the control means to reapply vacuum to all of the vacuum cups. Otherwise, the operation of the centralized control apparatus is identical to that described above and illustrated in the drawing.

Figure 7:
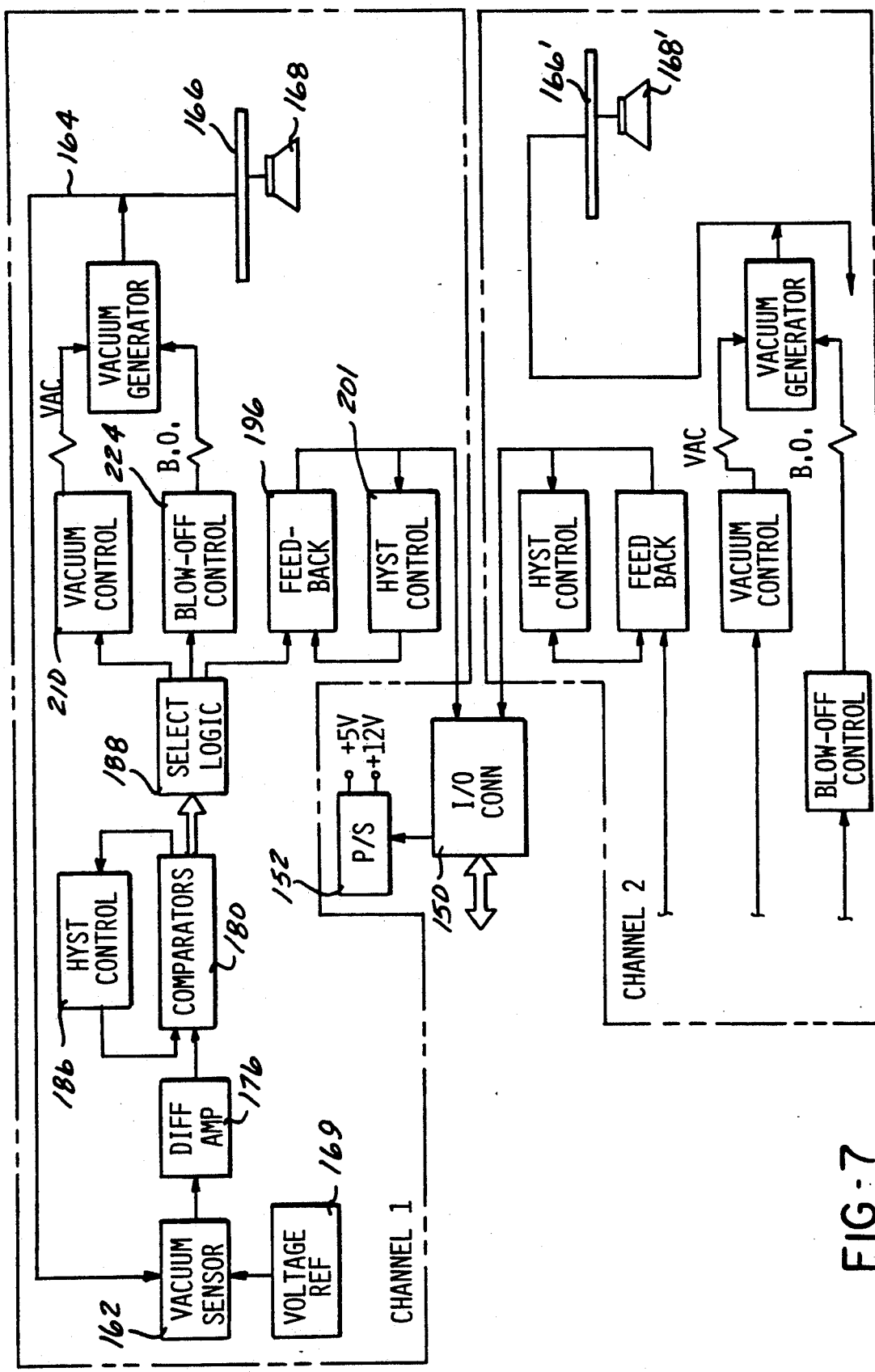
FIG. 7 is an electrical block diagram of a second embodiment of the vacuum control apparatus of the present invention.
Figure 8A:
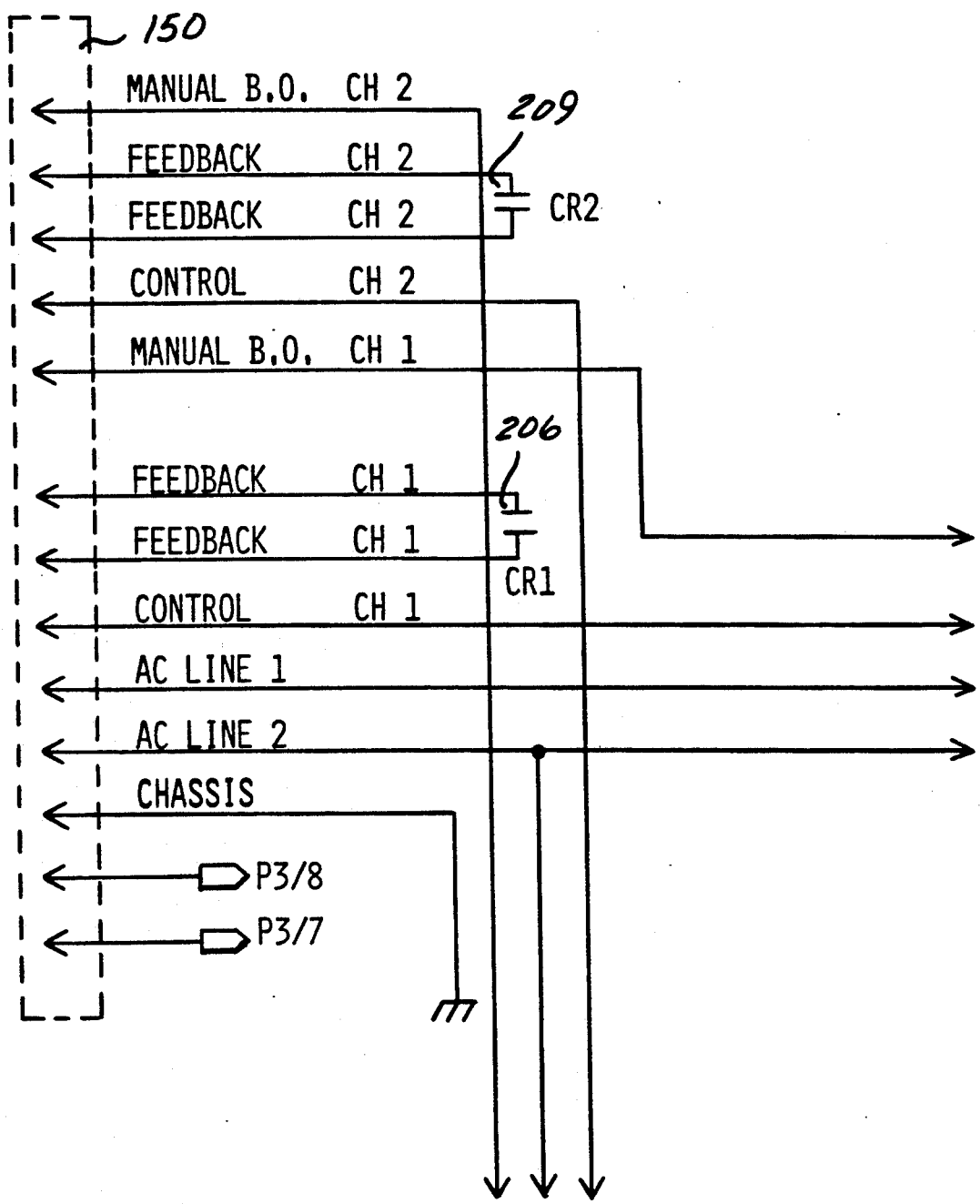
FIGS. 8A, 8B and 8C are detailed circuit diagrams of the vacuum control apparatus shown generally in FIG. 7.
Figure 8B:
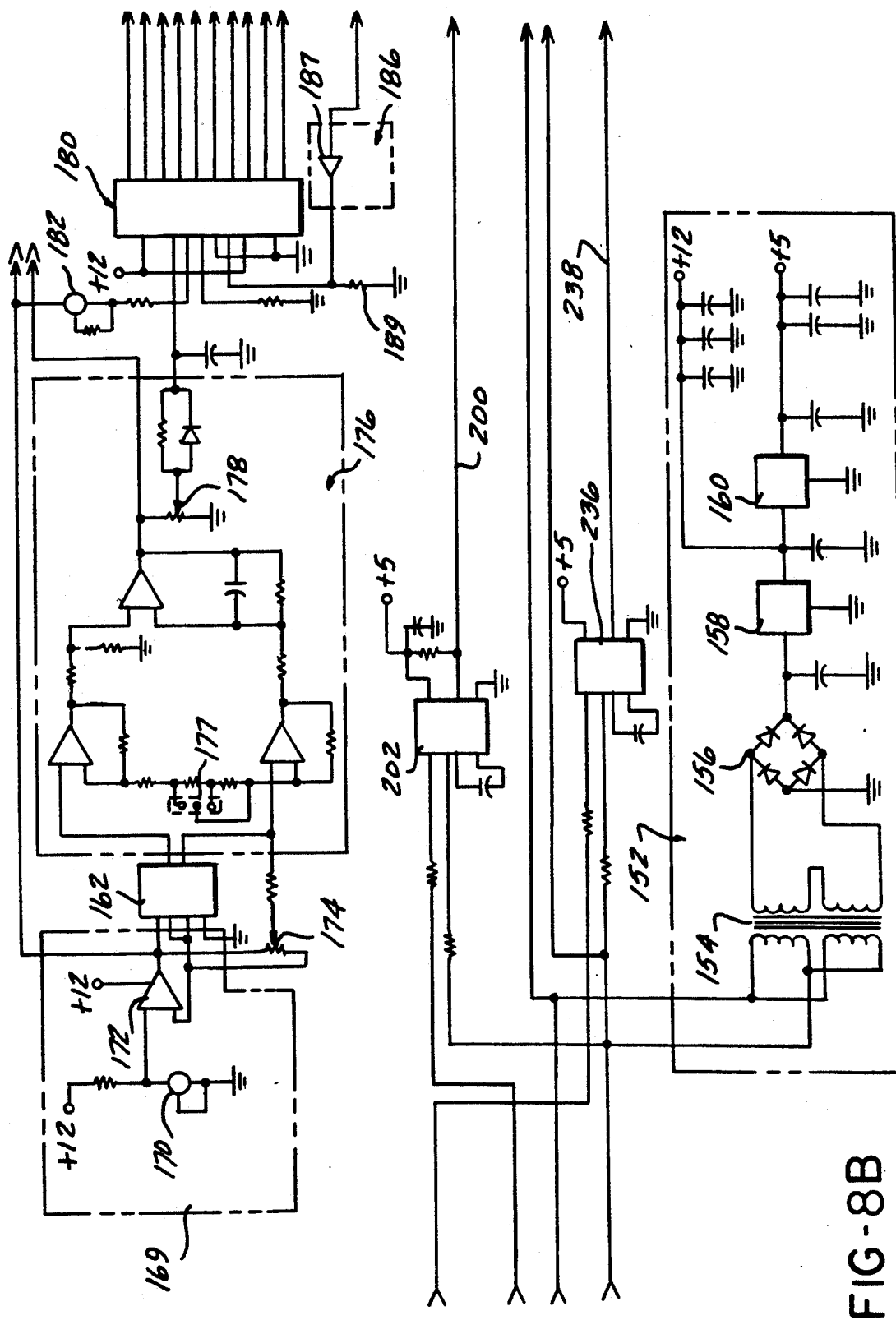

A second embodiment of the control means of the present invention is shown in FIGS. 7, 8A and 8B. This embodiment is particularly suited for use in a centralized system wherein a centrally located control means controls the application and release of vacuum to a plurality of remotely located vacuum responsive devices, such as vacuum cups. However, it will be understood that this embodiment of the present invention may also be employed with a single vacuum cup located in relatively close proximity to the control means.

In this embodiment, a venturi means is connected between a source of pressurized air and a fluid flow line or conduit which extends from the central vacuum control apparatus to a manifold to which the vacuum responsive devices, such as vacuum cups, are connected. A single valve means, as described hereafter, is controlled by the control apparatus of the present invention to supply pressurized air to the venturi means and thereby induce a vacuum in the fluid flow line and in all of the vacuum responsive devices connected to the vacuum line via the manifold. It will be understood that the venturi means may comprise a single venturi, as well as series and/or parallel arrangements of multiple venturis, to provide various ranges of vacuum levels and/or vacuum response times.

As shown in FIGS. 7, 8A, 8B and 8C, the second embodiment of the control means includes an input/output connector means 150 which is mounted in a housing containing the control means, the vacuum and blow-off control valves, the venturi vacuum generators and the select switches described in greater detail hereafter. The input/output connector 150, FIG. 8A, is configured to connect control signals between circuitry employed in the control means and an external control device or controller, such as a programmable logic controller (PLC). The input/output connector 150 provides connections for control signals for two separate, independently operable, channels, respectively carrying the designations "CH1" and "CH2", to apply and release vacuum to two separate vacuum cups or plurality of vacuum cups connected to two separate manifolds. It will be understood that any number of channels or separate vacuum controls may be provided in the present invention, with two channels being described hereafter only as an exemplary embodiment of the present invention.

The input/output connector 150, which may be any suitable type of connector, provides a number of signal connections for each channel, such as "MAN. B.O.", two signals labelled "FB", a control signal labelled "CTRL", AC power lines labelled "AC L1" and "AC L2", and a chassis ground. Other miscellaneous signals labelled "P3/7" and "P3/8" are also provided and will be described in greater detail hereafter.

The "AC L1" and "AC L2" electric power from the input/output connector 150 are input to a power supply 152 which generates the low level DC voltages required by the electronic components used in the control means. As shown in FIG. 8B, the power supply 152 includes a step-down transformer 154 which converts the typically 120 AC power to a more usable low voltage level. The secondary of the transformer 154 is connected to a full wave, rectifier bridge 156 which converts the AC power to DC power. A first voltage regulator 158 is connected to the output terminals of the bridge 156 and generates an output voltage labelled "+12" which is input to various selected components of the control means. A second voltage regulator 160 is connected to the first voltage regulator 158 and supplies a "+5" voltage to various components of the control means.

A Vacuum sensor means 162 is connected to the fluid flow line 164 extending from the vacuum generator to the manifold 166 from which at least one and, preferably, a plurality of vacuum suction cups 168 are connected. The vacuum sensor means 162 may comprise any conventional type of sensor which provides an electrical output signal indicative of the pressure levels sensed thereby. For example, a pressure sensor manufactured by IC Sensor Model No. 1220.030 may be employed as the vacuum sensor means 162.

A voltage reference circuit 169 is connected to the vacuum sensor 162. The voltage reference circuit 169 includes a constant voltage source 170 which provides an excitation voltage to an amplifier 172. The amplifier 172 converts the excitation voltage to a constant current and provides the amplified excitation current to the vacuum sensor means 162. A zero or offset adjust voltage is provided to the vacuum sensor means 162 via a potentiometer 174 connected between the output of the vacuum sensor means 162 and one of the inputs thereof.

The two outputs from the vacuum sensor 162 are input to a differential amplifier means 176 as shown in FIGS. 7 and 8B. The differential amplifier means 176 is formed of three operational amplifiers which amplify the low level signals from the vacuum sensor 162 to a more useful level. The amount of the signal from the differential amplifier means 176 which is passed to a comparator means 180 is adjustably selected by a span adjustment potentiometer 178. This enables the maximum magnitude of the signal output from the differential amplifier means 176 to be selected as desired to suit the needs of a particular application. It should also be noted that the gain of the operational amplifiers forming the differential amplifier means 176 of the present invention is adjustably selectable by means of a jumper 177 which cuts out selected resistors connected between two of the operational amplifiers.

The control apparatus includes a comparator means 180 which compares the output signal of the differential amplifier means 176 which corresponds to the vacuum level sensed by the vacuum sensor 162 with a plurality of incrementally discrete predetermined reference signals and generates one of a plurality of discrete outputs when the vacuum sensed by the vacuum sensor 162 equals one of the reference signals for use in selecting a desired vacuum level in the vacuum cup 168. In a preferred embodiment, the comparator means 180 comprises an integrated circuit, Model No. LM3914, which includes ten individual comparators connected in a ladder-type arrangement. Each of the ten comparators in the comparator means 180 receives the output of the differential amplifier means 176 as one input. The other input to each of the ten comparators forming the comparator means 180 is a voltage reference signal generated by a constant current source 182 which is divided via resistors serially connected between the inputs of each successive comparator. The junction of each two resistors is connected as an input to one of the comparators. This provides an incrementally decreasing voltage reference signal to each of the ten comparators so as to provide ten different, discrete output signals from the comparator means 180.

Figure 8C:
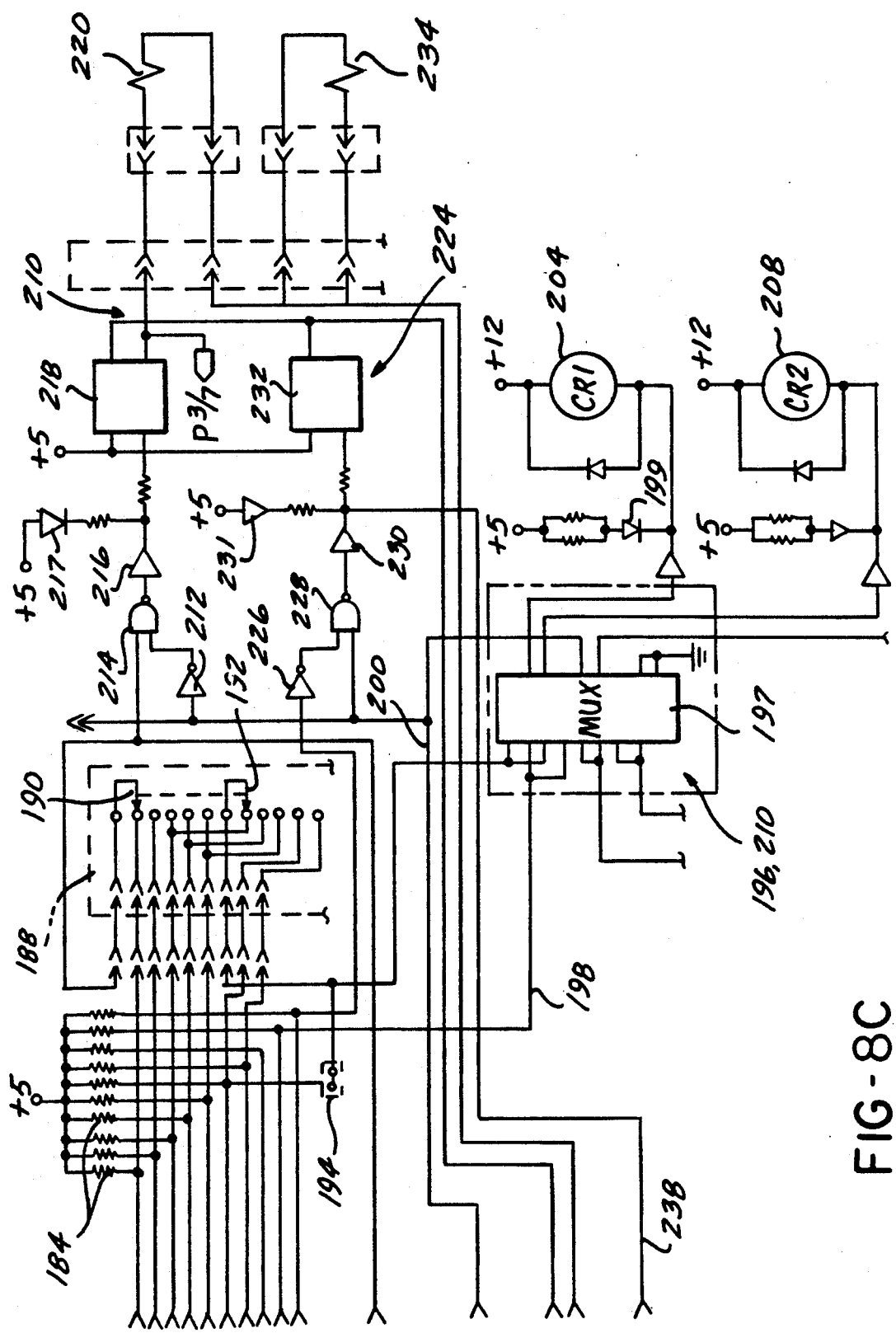

As shown in FIG. 8C, pull-up resistors 184 are connected between +5 volts and each of the comparator means 180 outputs to pull the comparator means 180 outputs up from ground.

In use, if the span adjust signal selected by the potentiometer 178 is positioned so as to provide a maximum output signal from the vacuum sensor means 162 indicative of a vacuum of 20 inches of mercury, for example, the outputs from the comparator means 180 will correspond to incrementally decreasing signal magnitudes corresponding, respectively, to 20, 18, 16, 14, 12, 10, 8, 6, and 4 inches of mercury. In the present embodiment, the tenth comparator of the comparator means 180 is employed as a blow-off control signal as described hereafter. On the other hand, if the span adjust signal provided by the potentiometer 178 correlates the output of the vacuum sensor means 162 to a signal level corresponding to six inches of mercury, the first output from the comparator means 180 will be a signal indicative of six inches of mercury; while the second comparator output corresponds to 5.4 inches, the third comparator to 4.8, etc. In this manner, the control apparatus of the present invention may be easily adapted to various vacuum application requirements.

The outputs from the comparator means 180 are input to a select logic circuit denoted in general by reference number 188 which acts as a means for selecting one of the comparator means 180 outputs and, thereby, a predetermined vacuum level for the vacuum cup. The select logic circuit 188 includes switch means which are capable of selecting at least one of the comparator means 180 outputs as a vacuum select level, as well as specifying or selecting a vacuum feedback signal level. In a preferred embodiment, the switch means comprises a switch having a first selector or switchable contact 190 and a second selector or switchable contact 192, as shown in FIG. 8C. In an exemplary embodiment of the present invention, the first selector 190 is electrically switchable between one of the five highest outputs of the comparator means 180. The second selector 192 is connected via suitable electrical connections to select one of five comparator means 180 outputs. In this embodiment, the first selector 190 selects the desired vacuum select level; while the second selector 192 selects the vacuum feedback signal level.

By way of example, if the span adjustment potentiometer 178 is positioned to provide a first comparator means 180 output corresponding to a vacuum level of twenty inches of mercury, the first switch selector 190 is capable of selecting one of the comparator means 180 outputs corresponding to 20, 18, 16, 14 or 12 inches of mercury. The second selector 192, as shown in FIG. 8C, is capable of selecting one of the comparator means 180 outputs corresponding to 16, 14, 12, 10 or 8 inches of mercury.

A hysteresis control means 186 is connected between the output of the select logic circuit 188 and an input of the comparator means 180. The output terminal of the selector 190 of the select logic circuit 188 is connected through an amplifier 187 to a resistor 189. The resistor 189 is connected to the internal serially-connected resistors in the comparator means 180 which serve as reference signal inputs. An output from the comparator means 180 will turn the amplifier 187 "on" and will cause the open collector output of the amplifier 187 to connect to ground. This shorts out the resistor 189 which has the effect of raising the magnitude of the reference signals applied to the comparator means 180 by a predetermined amount after an output has been generated by the comparator means 180. This creates a small window or band which prevents oscillation of the comparator means 180 when the vacuum level sensed by the sensor 162 decreases by only a small amount from the preselected vacuum level. For example, if the preset vacuum level was selected to correspond to a vacuum of twenty inches of mercury, the hysteresis control means 186 would provide an offset to the reference signal input to the comparator means 180 which would prevent the re-enablement of the comparator means 180 and the reapplication of vacuum to the vacuum responsive device until the vacuum level fell by a predetermined amount, such as to a level corresponding to eighteen inches of mercury. When all of the outputs of the comparator means 180 are low indicating the cessation of the application of vacuum to the vacuum responsive device, the output of the amplifier 187 will go low thereby resetting the reference signals to their initial, normal values as described above.

A fixed feedback select signal corresponding to ten inches of mercury, in the above example, is provided by a jumper 194 connected between the comparator means 180 output corresponding to a vacuum level of ten inches of mercury in the present example and one terminal of the second selector 192 of the switch means. Removal of the jumper 194 enables the second selector 192 to switchably select a different comparator means 180 output as a feedback signal level.

The output from the feedback selector 192 of the select logic circuit 188 is input to a feedback control means 196 including a multiplexer 197 which generates the vacuum feedback signal. One input to the multiplexer 197 for channel 1 is the output from the second selector 192 which may be one of the comparator means 180 outputs or the fixed comparator means 180 output utilizing the jumper 194 as described above. A second input to the multiplexer 197 for channel 1 is the lowest vacuum level signal from the comparator means 180 via line 198 from the comparator means 180 as shown in FIG. 8C. The select signal on line 200 to the multiplexer 197 is generated by a control signal labelled "CONTROL CH1" from the input/output connector 150. This signal is generated by an external controller and is input, through the input/output connector 150, to an opto-coupler 202 which optically converts the level of the input signal to the low logic level required by the multiplexer 197. This select signal which is "low" for vacuum and "high" for blow-off selects which one of the two inputs to the multiplexer 197 for channel 1 is to be looked at so as to generate an output when the selected input is present.

When the vacuum level sensed by the pressure sensor 162 matches the level selected by the select logic 188 for the predetermined feedback vacuum level during a "vacuum on" condition, the multiplexer 197 will select the first input and generate an output which will activate a switch means, such as a relay labelled "CR 1" and shown by reference number 204. The relay 204 has a switchable contact 206 shown in FIG. 8A which is connected between the two feedback signal lines, labelled "FEEDBACK CH1" on the input/output connector 150, FIG. 8A, and connected to the external controller. This feedback signal may be utilized by the external controller as a signal indicating a certain predetermined amount of vacuum has been generated. This vacuum level may be sufficient to pick up a workpiece or object; but is typically less than the vacuum select level described hereafter which is required to securely grasp the workpiece or object. Further, an LED 199 connected through an amplifier to the output of the multiplexer 197 will be illuminated to indicate the generation of the feedback signal. This light could also be employed as a "part present" signal.

As shown in FIG. 8C, a second output from the multiplexer 197 designated for channel 2 energizes a second switch means 208, such as a relay labelled "CR 2". The relay 208 has a switchable contact 209, FIG. 8A, connected between the feedback signals "FEEDBACK CH2" on the input/output connector 150. This feedback signal functions in the same manner for channel 2 as the feedback signal described above for channel 1.

A feedback hysteresis control function denoted in general by reference number 201 in FIG. 7 is also provided by the multiplexer 197. The "CONTROL CH1" signal, when blow-off is selected, is used as a select signal by the multiplexer 197 to select the second input which corresponds to a lower vacuum level. This can be employed during blow-off conditions as a separate feedback signal to the external controller.

The output from the select logic 188, particularly the output of the first selector 190, is input to a vacuum control circuit denoted in general by reference number 210 in FIGS. 7 and 8C. The "CONTROL CH1" signal from the external controller which is connected by the opto-coupler 202 to a low level signal on line 200 is inverted by an inverting amplifier 212 whose output is connected to one input of a NAND gate 214. The other input to the NAND gate 214 is the output of the first selector 190 of the select logic means 188. The vacuum/blow-off signal labelled "CONTROL CH1" from the external controller acts as a select enabling the vacuum control circuit 210 to generate vacuum in the vacuum generator by passing a flow of pressurized air at high velocity through the venturi in the apparatus housing. The output of the NAND gate 214 will normally be high prior to receiving the "CONTROL CH1" signal from the external controller since the output of the comparator means 180 as selected by the selector 190 of the select logic 188 will be high since the actual vacuum is less than the desired vacuum level selected by the selector 190. The inverted "CONTROL CH1" signal, when high, will switch the output of the NAND gate 214 to a low state. This NAND gate 214 output, through an amplifier 216, energizes a first driver means 218. The first driver means 218 preferably comprises a relay containing an internal, normally open, switchable contact which supplies power, when switched, to a first solenoid valve 220 which is connected to the source of pressurized air to supply such pressurized air to the venturi associated with channel 1. Pressurized air will be applied via the solenoid 220 until the vacuum level in the fluid flow line 164, as sensed by the vacuum sensor 162, reaches the selected vacuum level as selected by the select logic 188 and the comparator means 180. When this occurs, a high comparator means 180 output will drive one input to the NAND gate 214 low thereby de-energizing the first driver relay 218 and the solenoid 220.

If the vacuum level in the vacuum line 164 falls below the present level, as set by the hysteresis control circuit 186, such a difference will be detected by the comparator means 180 which will then drive the output of the NAND gate 214 low to again energize the first driver relay 218 and the first solenoid 220 to reapply vacuum until the prescribed vacuum select level is reached.

Whenever the amplifier 216 is activated, an LED 217 will be illuminated to show a "vacuum on" condition. Further, an output signal labelled "P3/7" from the first driver 218 is supplied to the input/output connector 150 to indicate that the first driver 218 has been activated.

In this manner, the desired vacuum select level may be selected via the first selector 190 of the select logic circuit 188 to any one of a plurality of discrete levels as provided by the different outputs of the comparator means 180. A similar and separately operable circuit is provided for channel 2 which drives a second solenoid valve to supply vacuum to the second manifold 166' and the one or more suction cups 168' connected thereto.

Blow-off is necessary to insure that the vacuum cup 168 is completely separated from the workpiece at the termination of a particular operation. Blow-off may be provided by the control apparatus of the present invention either automatically or via an external signal from an external controller. Automatic blow-off is provided by the last comparator of the comparator means 180 which has the lowest possible vacuum level, such as four inches of mercury in the above-described example. This comparator means 180 output is connected through an inverting amplifier 226 to one input of a NAND gate 228. The other input to the NAND gate 228 is the signal "CONTROL CH1" which selects either vacuum or blow-off. If blow-off is selected and the vacuum level set by the particular comparator means 180 output is sensed by the vacuum sensor 162, the NAND gate 228 will provide an output through amplifier 230 to a second driver means 232, such as a relay. The second driver means 232 energizes a second or blow-off solenoid 234 which provides a flow of pressurized air directly through the manifold 166 and the vacuum line 164 to the vacuum cup 168 to forcibly separate the vacuum cup 168 from the previously attached object.

Manual blow-off is provided by a signal labelled "MAN B.O. CH1" from the input/output connector 150. This signal is converted by an opto-coupler 236, FIG. 8B, to provide a low level signal on line 238 which is connected directly to the second driver 232 to energize the second driver 232 and, thereby, the second blow-off solenoid 234. The presence of a low level signal at the output of the amplifier 230 will illuminate LED 231 to indicate "vacuum off".

In operation, a desired vacuum select level is selected by the select logic switch selector 190. In this example, a vacuum level of 20 inches of mercury will be selected. When vacuum is to be applied through the vacuum cup 168 to attract and grasp an object or workpiece, a vacuum select signal labelled "CONTROL CH1" from an external controller will be input to the input/output connector 150. This signal, as described above, will cause the first driver means 218 to be energized which will activate the first solenoid 220 and supply a flow of pressurized air through the venturi to generate a vacuum in the vacuum line 164, the manifold 166 and the vacuum cup 168. Vacuum will continue to be applied to the vacuum cup 168 until the vacuum level in the vacuum line 164, as sensed by the vacuum sensor 162, equals the preselected vacuum level of twenty inches of mercury. When the two signals equal, the comparator means 180 will provide an output through the first comparator means 180 output which will be connected via the selector 190 to the NAND gate 214 and cause the first driver means 218 and the first solenoid 220 to be de-energized. This stops the further generation of vacuum to the vacuum cup 168.

At any time after vacuum is initially applied to the vacuum cup 168 and shut off, and prior to the initiation of any blow-off, if, for any event, the vacuum in the vacuum cup 168 decreases below the preselected vacuum select level, such a decrease will be sensed by the vacuum sensor 162 which will drive the selected output of the comparator means 180 high and cause the NAND gate 214 to generate a signal re-energizing the first driver 218 and the first solenoid 220 to reapply vacuum to the vacuum cup 168 to bring the vacuum level up to the preselected amount. This process will continue indefinitely to maintain the vacuum in the vacuum cup 168 at the selected level.

When it is desired to separate the vacuum cup 168 from the workpiece, the external controller will drive the signal labelled "CONTROL CH1" low which, through the circuitry described above, will de-energize the first driver means 218 and the first solenoid 220. This will also energize the blow-off control circuit 224 to provide a flow of pressurized air by the second solenoid 234 to the vacuum cup 168.

Manual blow-off may be implemented at any time via the generation of a signal labelled "MANUAL B.O. CH1" from the external controller. This signal operates to energize the second driver 232 and the second solenoid 234 to provide the desired flow of pressurized air directly to the vacuum cup 168.

In the above-described embodiment, the select logic circuit 188 has been described as including a switch having two selectors 190 and 192. A similar select logic circuit is provided for channel 2 to provide independent control of the vacuum level, feedback signal and blow-off for channel 2.

A differently configured select logic circuit may be employed to vary the function of the switch means in controlling the vacuum select level and the vacuum feedback level signal of one or more channels of the apparatus. Thus, a different select logic circuit may be employed through wiring connections to enable the two selector switch shown in FIG. 8C to control the vacuum select levels of both of the first and second channels of the apparatus; while the second switch selector controls the feedback signals for each of the two channels. Alternately, when using a fixed feedback signal level, via the jumper 194 described above and shown in FIG. 8C, a single switch may be employed with suitable select logic connections to provide the vacuum select levels for each of two channels.

The above description of the operation of channel 1 of the control apparatus of the present invention applies equally to the operation of channel 2. As channel 2 includes the same circuits, for brevity, certain of the components, such as the vacuum sensor 162, differential amplifier means 176, comparator means 180 and select logic 188 have been deleted from FIG. 7. However, it will be understood that channel 2 includes such components and operates in the same manner as that described above for channel 1.

Further, it will be understood that the control apparatus controls the two channels 1 and 2 independent of each other so as to provide two different vacuum select levels to two different vacuum manifolds 166 and 166' at the same time. Each vacuum level may be independently selected and, further, different feedback signals may be selected and provided for each of the two channels. However, as noted above, the operation of the switch means in the select logic circuit 188 may be modified such that a single switch provides selection of the vacuum select levels in each of the two channels, assuming that a fixed feedback signal is employed for each of the channels.

In summary, there has been disclosed a unique vacuum cup control apparatus which overcomes many of the problems encountered with previously devised vacuum cup control apparatus. The apparatus of the present invention monitors vacuum pressure within the vacuum cup and controls the reapplication of vacuum to the vacuum cup so as to maintain the vacuum level at a predetermined level. If any leaks exist which would cause the vacuum in the vacuum cup to decrease below the predetermined level, the control apparatus automatically reapplies vacuum to the vacuum cup.

The control apparatus of the present invention also includes a blow-off control which injects a stream of pressurized air to the vacuum cup to relieve vacuum therein and to separate the workpiece from the vacuum cup. In the event that vacuum is still present for any reason as the vacuum cup separates from the workpiece, the blow-off control will be automatically re-energized to supply another stream of pressurized air to insure positive separation of the vacuum cup from the workpiece.

The vacuum cup control apparatus of the present invention may be applied to each vacuum cup in a particular manufacturing operation. Alternately, a single control may be connected through individual vacuum and pressurized air flow conduits to separate vacuum cups.

What is claimed is:

1. A vacuum control apparatus for applying a flow or pressurized air through a venturi to create a vacuum in a vacuum responsive device, the vacuum control apparatus comprising:

sensor means, disposed in fluid flow communication with a fluid flow conduit connected to the vacuum responsive device, for sensing the vacuum level applied to the vacuum responsive device and providing an output signal proportional thereto;

connector means, for receiving electrical signals specifying the application and release of vacuum in the vacuum responsive device;

first valve means for controlling the flow of pressurized air to the venturi;

control means, responsive to the sensor means and the connector means, for controlling the selective application of a predetermined vacuum pressure to the vacuum responsive device and the re-application of vacuum to the vacuum responsive device in the event of a decrease of vacuum below a predetermined level after vacuum is applied to the vacuum responsive device, the control means including:

comparator means, responsive to the sensor means output signal and a plurality of discrete, different reference signals, for comparing the sensor means output signal with each of the reference signal and generating one of a plurality of discrete outputs, each corresponding to a different vacuum level output;

means for selecting one of the comparator means outputs as an output specifying a predetermined amount of vacuum to the vacuum responsive device; and first driver means, responsive to the output of the selecting means, for energizing the first valve means to supply pressurized air to the venturi to supply a specified vacuum level to the vacuum responsive device when the output signal of the sensor means indicates a vacuum level in the vacuum responsive device less than the selected vacuum level.

2. The vacuum control apparatus of claim 1 wherein the comparator means comprises:

a plurality of individual comparators;

the output signal of the sensor means being connected as an input to each of the plurality of comparators; and means for varying the magnitude of the reference signal applied to each of the plurality of comparators by a predetermined amount from the magnitude of the reference signal applied to a preceding one of the plurality of comparators.

3. The vacuum control apparatus of claim 2 wherein the means for varying the magnitude of the reference signal comprises:

a first reference signal connected to the input of a first one of the plurality of comparators;

a plurality of serially connected resistors connected to the first reference signal; and the juncture of each of the serially connected resistors being respectively connected as an input to each of the other of the plurality of comparators and acting as a reference signal input to each of the other of the plurality of comparators.

4. The vacuum control apparatus of claim 3 wherein:

each of the serially connected resistors has the same resistance so as to incrementally offset the reference signal input to each of the other of the plurality of comparators by an incremental amount.

5. The vacuum control apparatus of claim 1 wherein the selecting means comprises:

switch means switchable between a plurality of discrete positions, each position connected to one of the plurality of comparator outputs.

6. The vacuum control apparatus of claim 1 wherein the control means further comprises:

hysteresis control means, connected between the output of the comparator means and the reference signals, for varying the magnitude of the reference signals by a predetermined amount from the initial magnitude of the reference signals after an output signal is generated by the comparator means until the vacuum level sensed by the sensor means falls below the predetermined level set by the hysteresis control means.

7. The vacuum control apparatus of claim 1 further comprising:

second valve means connected in fluid flow communication with the vacuum responsive device for supplying air under pressure to the vacuum responsive device;

the control means further comprising:
second driver means for energizing the second valve means to apply air under pressure to the vacuum responsive device; and
the second driver means also being separately responsive to an electrical signal from the connector means for activating the second driver means.

8. The vacuum control apparatus of claim 1 wherein the control means further comprises:
second means for selecting one of the plurality of comparator outputs as a feedback signal indicating the vacuum level in the vacuum line connected to the vacuum responsive device, the output of the second selecting means being connected to the connector means.

9. A vacuum control apparatus for applying a flow of pressurized air through a venturi to create a vacuum in a vacuum responsive device, the vacuum control apparatus comprising:
sensor means, disposed in fluid flow communication with a fluid flow line connected to the vacuum responsive device, for sensing the vacuum applied to the vacuum responsive device and providing an output signal proportional thereto;
connector means, for receiving electrical signals specifying the application and release of vacuum in the vacuum responsive device;
first valve means for controlling the flow of pressurized air to the venturi;
second valve means connected in fluid flow communication with the vacuum responsive device for supplying air under pressure to the vacuum responsive device; and
control means, responsive to the sensor means and the connector means, for controlling the selective application of a predetermined vacuum pressure to the vacuum responsive device and the re-application of vacuum to the vacuum responsive device in the event of a decrease of vacuum below a predetermined level after vacuum is applied to the vacuum responsive device, the control means including:
comparator means responsive to the sensor means output signal and a plurality of reference signals, for comparing the sensor means output signal with the reference signals and generating one of a plurality of discrete outputs each corresponding to a different vacuum level output sensed by the sensor means, the comparator means including:
a plurality of individual comparators;
the output signal of the sensor means being connected as an input to each of the plurality of comparators; and
means for varying the magnitude of the reference signal applied to each of the plurality of comparators by a predetermined amount from the magnitude of the reference signal applied to a preceding one of the plurality of comparators;
first means for selecting one of the comparators outputs as an output specifying a predetermined amount of vacuum in the vacuum responsive device, the first selecting means including:
switch means switchable between a plurality of discrete positions, each position connected to one of the plurality of comparators outputs;
second means for selecting one of the plurality of comparator outputs as a feedback signal indicating the vacuum level in the vacuum line connected to the vacuum responsive device, the output of the second selecting means being connected to the connector means;
first drive means, responsive to the output of the first selecting means, for energizing the first valve means to supply pressurized air to the venturi to supply a specified vacuum level to the vacuum responsive device when the output signal of the sensor means indicates a vacuum level in the vacuum responsive device less than the selected vacuum level; and
second driver means for energizing the second valve means to supply air under pressure to the vacuum responsive device, the second driver means also being separately responsive to an electrical signal from the connector for activating the second driver means.

* * * * *